Patented Nov. 19, 1946

2,411,427

UNITED STATES PATENT OFFICE 2,411,427

AGE RESISTORS FOR RUBBER

Albert F. Hardman, Akron, Ohio, assignor to Wingfoot Corporation, Akron, Ohio, a corporation of Delaware No Drawing. Application March 1, 1944, Serial No. 524,631

2 Claims. (Cl. 260—808)

This invention relates to the preservation of rubber, and more particularly to the provision and use of a novel class of age resistors for rubber.

The age resistor compounds of the invention may be prepared by reacting a primary aromatic amine with formaldehyde and a naphthol. The reaction is best carried out in an anhydrous solvent, such as benzene or toluene, the water of reaction being eliminated by refluxing the solvent through a water trap.

The compounds are believed to conform to the structural formula

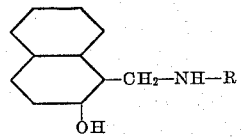

or

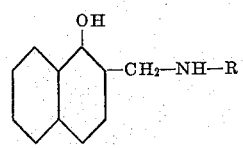

depending upon whether a beta-naphthol or an alpha-naphthol is used, R being an aromatic radical, such as a phenyl or naphthyl group.

The preparation of the age resistors is illustrated by the following examples:

Example 1

Forty-four grams of p-amino phenol, 58 grams of β-naphthol, 13 grams of paraformaldehyde, 1 gram of piperidine, and 250 cc. of toluene were mixed and the mixture was refluxed, using a water trap. In a short time, crystals began to form in the solution, while water collected in the trap. After 8 cc. of water had collected, the crystals were filtered from the hot solution, washed with benzene and dried. The yield was 46 grams of gray crystals, melting at 153° C. The product was 1-(p-hydroxyphenylamino-methylene)-β-naphthol.

Example 2

Twenty-two grams of p-phenylene-diamine, 58 grams of β-naphthol, 13 grams of paraformaldehyde, 350 cc. of toluene and 5 drops of piperidine were mixed and refluxed as in Example 1. After 7.5 cc. of water had collected, the crystals formed were filtered off and washed with benzene. The yield was 49 grams of white crystals, which on heating changed in color from white to yellow to red, finally melting at 166° C. The product was p-phenylene bis (1-amino-methylene)-β-naphthol.

Example 3

A mixture of 72 grams of β-naphthylamine, 72 grams of β-naphthol, 250 cc. of toluene, 15 grams of paraformaldehyde and 5 drops of piperidine was refluxed as in Example 1. After about 7.0 cc. of water had collected in the water trap, the solution suddenly set to a mass of crystals. The yield was 109 grams of silky, white needles, melting at 208° C. The product was 1-(β-naphthylamino-methylene)-β-naphthol.

Example 4

A mixture of 20 grams of benzidine, 30 grams of β-naphthol, 250 cc. of toluene, 7 grams of paraformaldehyde and 5 drops of piperidine was refluxed as in Example 1, until 4 cc. water had been collected. The product was filtered off and washed with benzene. The yield was 27 grams of a gray powder, which turned red and decomposed at 207° C. The product was p,p'-diphenylene bis(1-amino-methylene)-β-naphthol.

Example 5

A mixture of 54 grams of p-toluidine, 72 grams of β-naphthol, 250 cc. of toluene, 15 grams of paraformaldehyde and 5 drops of piperidine was treated as in Example 1. The product consisted of fine white crystals which melted at 137° C. This was 1-(p-methyl phenylamino-methylene)-β-naphthol.

Example 6

A mixture of 70 grams of p-phenetidine, 72 grams of β-naphthol, 150 cc. of toluene, 15 grams of paraformaldehyde and 5 drops of piperidine was treated as in Example 1. The product consisted of a white powder, melting at about 110° C. This was 1-(p-ethoxy phenylamino-methylene)-β-naphthol.

Various other primary aromatic amines may be employed in place of those used in the examples. In addition to the aryl amines in which the aromatic radical is hydrocarbon, various aromatic amines containing substituents on the aromatic ring may also be employed. The preferred substituents are hydroxyl and primary amino radicals and these are preferably in the para position. Where more than one primary amino group is present in the amine, the methylene-naphthol group may attach to one or more of the amino groups. Alpha-naphthol may be used in place of beta-naphthol, but generally with less satisfactory results. It is believed that, when beta-naphthol is used, the arylamino-methylene group attaches in the 1-position and that when alpha-naphthol is used the attachment is in the 2-position. The naphthol may also contain various substituents.

The products of the examples were tested in rubber as age resistors by heating them in an oxygen bomb for six days at a temperature of 50° C. and an oxygen pressure of 150 pounds per square inch. The formula employed was

| | Parts by weight |
|---|---|
| Extra pale crepe | 100.0 |
| Sulfur | 3.0 |
| Zinc oxide | 5.0 |
| Stearic acid | 1.5 |
| Hexamethylene tetramine | 1.0 |
| Age resistor | 1.0 |

The stocks were compared with a control in which the age resistor was the well-known commercial antioxidant, phenyl-beta-naphthylamine. The rubber compounds were tested before and after aging and their tensile strengths were compared to that of the control stock. The following table shows the rating of the various age resistors as compared with phenyl-beta-naphthylamine:

| | Per cent |
|---|---|
| Example 1 | 108 |
| Example 2 | 100 |
| Example 3 | 76 |
| Example 4 | 60 |
| Example 5 | 35 |
| Example 6 | 52 |

What I claim is:

1. The method of treating rubber which comprises vulcanizing it in the presence of 1-(p-hydroxyphenylamino-methylene)-β-naphthol.

2. A rubber product which has been vulcanized in the presence of 1-(p-hydroxyphenylamino-methylene)-β-naphthol.

ALBERT F. HARDMAN.